United States Patent [19]

Zelt et al.

[11] 4,163,167
[45] Jul. 31, 1979

[54] ELECTRIC MOTOR BRUSH HOLDER

[75] Inventors: Edward J. Zelt; William L. Dippold; Robert L. Gerg; Raymond W. Klaiber, Jr., all of St. Marys, Pa.

[73] Assignee: Stackpole Carbon Company, St. Marys, Pa.

[21] Appl. No.: 856,661

[22] Filed: Dec. 2, 1977

[51] Int. Cl.² .................................................. H02K 13/00
[52] U.S. Cl. ..................................... 310/242; 310/248
[58] Field of Search ............... 310/239, 240, 242, 241, 310/244, 245, 246, 247, 249, 248, 250, 251, 220, 252, 230, 253, 231

[56] References Cited

U.S. PATENT DOCUMENTS

| 1,424,326 | 8/1922 | Trostle | 310/240 |
|---|---|---|---|
| 1,757,696 | 5/1930 | Wood | 310/244 |
| 2,324,299 | 7/1943 | Haifley | 310/239 |
| 2,463,097 | 3/1949 | Gayer | 310/239 |
| 2,842,692 | 7/1958 | Johnson | 310/239 |
| 2,851,622 | 9/1958 | Hall | 310/246 |
| 2,985,782 | 5/1961 | Stiles | 310/240 |
| 3,045,137 | 7/1962 | Simmons | 310/239 |
| 3,242,362 | 3/1966 | Ciliax | 310/239 |
| 3,656,018 | 4/1972 | Masher | 310/242 |
| 3,710,160 | 1/1973 | Voglesonger | 310/247 |

Primary Examiner—R. Skudy
Attorney, Agent, or Firm—Brown, Flick & Peckham

[57] ABSTRACT

A frame that has a central opening through it for the commutator of an electric motor is provided with a pair of brush housings, each having a passage therethrough in which a brush is slidable. One side of each housing is provided with a longitudinal slot, beside which a stud projects from the frame. The central coil of a torsion spring encircles the stud and has end portions extending laterally toward the housing, with the free ends of the spring biased toward each other. One end of the spring engages an abutment at the inner end of the housing and the opposite end of the spring extends through the housing slot and into a notch in the side of the brush to hold the brush retracted in the housing passage until the end of the spring is removed from the notch and placed against the outer end of the brush to move the inner end of the brush into commutator-engaging position.

4 Claims, 4 Drawing Figures

ELECTRIC MOTOR BRUSH HOLDER

In the manufacture of electric motors, the present practice generally is to assemble the motor brushes and their springs during assembly of the motor. This is a relatively costly operation. Therefore, it has been proposed, as shown in U.S. Pat. Nos. 3,656,018 and 3,710,160, to provide means for holding the brushes retracted in their holders so that the brushes and holders can be preassembled and later assembled into the motor housings. Such a system would permit more automation in the assembly of the motors.

It is among the objects of this invention to provide a brush holder, in which the brushes can be held in retracted position in a simple manner by the same springs that later press them against a commutator, in which the springs can quickly and easily be shifted from brush-holding position to operating position, and in which at most only a slight change needs to be made in conventional brushes in order to use them in the holder.

The preferred embodiment of the invention is illustrated in the accompanying drawings, in which FIG. 1 is an elevation of the brush holder with the brushes engaging a commutator;

Figure 1:
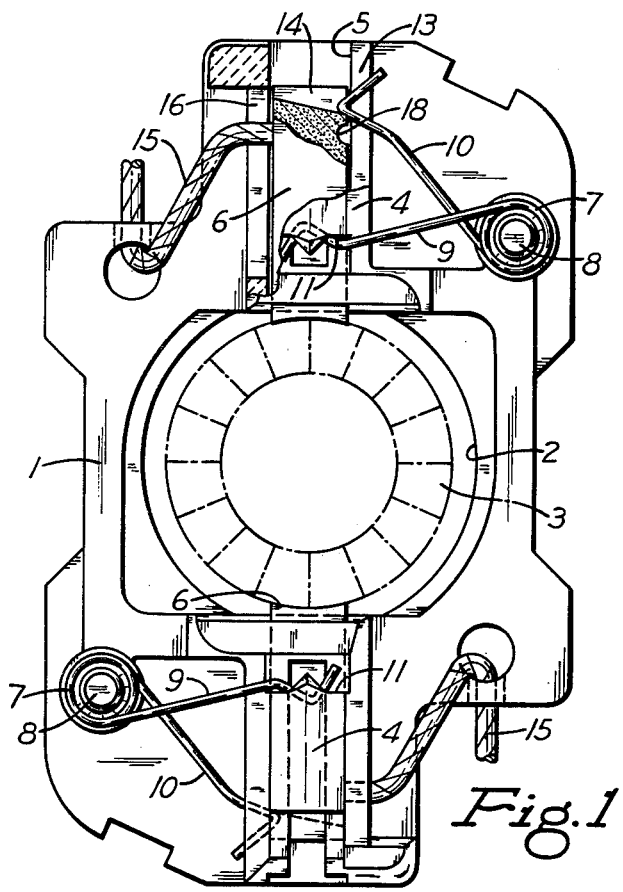
Figure 2:
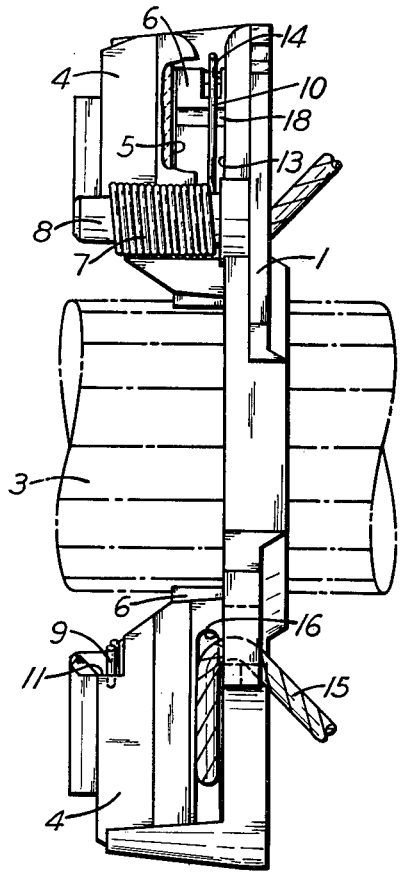
FIG. 2 is a side view.
Figure 3:
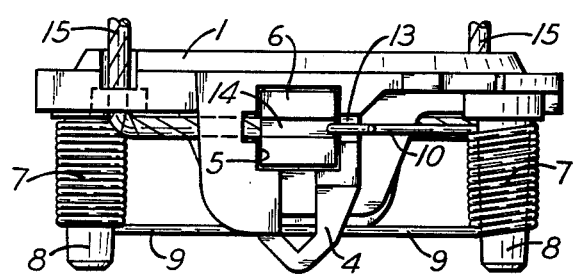
FIG. 3 is an end view.

Referring to FIGS. 1 to 3 of the drawings, a generally flat frame 1 is provided for attachment in an electric motor housing (not shown) in the usual manner. The frame, which is made of dielectric material, such as a plastic, has a central opening 2 for encircling the motor commutator 3. The frame is provided beside the opening with a pair of projecting brush housings 4 through it located 180° apart. Each housing has a passage 5 through it, the longitudinal axis of which is disposed radially or nearly radially of the commutator. Slidably disposed in each housing passage is a brush 6. The passage is square in cross section for a square brush.

Each brush is pressed against the commutator by a torsion spring. The spring has a central coil 7 that encircles a stud 8 projecting from the frame at one side of the adjacent brush housing, from which the stud is spaced. End portions 9 and 10 of the coil extend away from the stud toward the brush housing, and the ends of the spring are located near the opposite ends of the housing. The spring is stressed in such a way that its ends are biased toward each other. The inner end of the spring engages an abutment 11, with which the brush housing is provided near its inner end. The abutment faces toward the commutator. This end of the spring may be provided with a reverse bend that projects into an opening in the abutment to help hold the end in place to prevent it from moving toward the outer end of the housing.

The side of the housing facing the stud is provided with a longitudinal slot 13, through which the outer end portion of the spring extends. This end of the spring overlies and presses against the outer end of the brush so as to press the brush against the commutator. As the brush wears, the part of the spring in the slot moves toward the commutator. Preferably, the outer end of the brush has a slot 14 extending across it from the housing slot for receiving the end of the spring, which is provided with a reverse bend for best results.

The outer end portion of the brush is rigidly connected to a flexible shunt 15 that extends out of the housing. Although the shunt may extend out of the outer end of the passage 5, it is preferred to have it extend laterally out through a longitudinal slot 16 in the side of the housing opposite to the other housing slot 13. As the brush wears, the shunt moves inwardly along slot 16.

Figure 4:
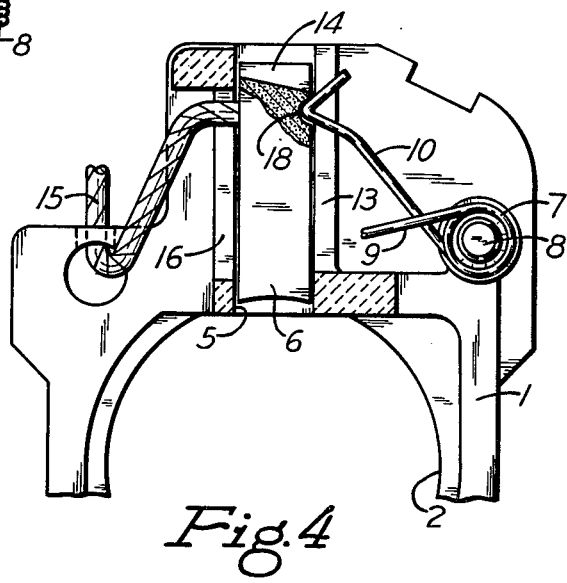
FIG. 4 is a fragmentary view, partly in section, showing one of the brushes in retracted position.

It is a feature of this invention that before the brush holder is mounted in a motor housing the brushes are held in retracted positions so that the holder can be quickly assembled with the motor housing without interference between the brushes and the commutator. Accordingly, the outer end of the side of the brush that is beside the housing slot 13 facing the stud is provided with a notch 18. This notch is in such position that when the brush is retracted into the housing passage the end of the spring that normally engages the outer end of the brush can project into the notch as shown in FIG. 4. This engagement of the spring and brush prevents the brush from moving in either direction in the housing and holds it securely in retracted position.

After the brush holder has been mounted in place in the motor housing, the springs are easily pulled out of the brush notches and the brushes moved forward far enough to permit the outer ends of the springs to then engage the outer ends of the brushes in the transverse slots 14. Each stud 8 is located substantially opposite the adjacent abutment 11 so that the springs will press tightly against the sides of the brushes when in their notches 18.

According to the provisions of the patent statutes, we have explained the principle of our invention and have illustrated and described what we now consider to represent its best embodiment. However we desire to have it understood that, within the scope of the appended claims, the invention may be practiced otherwise than as specifically illustrated and described.

We claim:

1. A brush holder comprising a frame having a central opening therethrough for the commutator of an electric motor, the frame being provided with a pair of brush housings beside said opening 180° apart, each housing having a passage therethrough with inner and outer ends, a brush slidably disposed in said passage, one side of said housing being provided with a longitudinal slot therethrough beside the brush, a stud projecting from said frame at said one side of the housing, and a torsion spring having a central coil encircling said stud and having end portions extending laterally away from the coil toward said housing with the free ends of the springs biased toward each other, the inner end portion of said housing having an abutment facing toward the inner end of the housing, one end of the spring engaging said abutment to prevent said end from moving toward the outer end of the housing, the outer end of the side of the brush beside said slot being provided with a notch, and the opposite end of the spring extending through said slot and projecting into said notch to hold the brush retracted in said passage until said opposite end of the spring is removed from the notch and placed against the outer end of the brush to move the inner end of the brush into commutator-engaging position.

2. A brush holder according to claim 1, in which the outer end of the brush is provided with a slot extending across it from said longitudinal slot and adapted to receive said opposite end of the spring when removed from said brush notch.

3. A brush holder according to claim 1, in which said stud is located substantially opposite said abutment.

4. A brush holder according to claim 1, in which the outer end of the brush is provided with a slot extending across it from said longitudinal slot and adapted to receive said opposite end of the spring when removed from said brush notch, said stud is located substantially opposite said abutment, said housing is provided with a longitudinal slot therethrough at the side of the brush opposite said brush notch, and said holder includes a flexible shunt extending through said last-mentioned slot and secured to the brush.

* * * * *